United States Patent
Nakata et al.

(10) Patent No.: US 9,598,592 B2
(45) Date of Patent: Mar. 21, 2017

(54) INK SET AND INK JET RECORDING METHOD

(71) Applicant: CANON KABUSHIKI KAISHA, Tokyo (JP)

(72) Inventors: Eiichi Nakata, Kawasaki (JP); Hirofumi Ichinose, Tokyo (JP); Kouhei Nakagawa, Tokyo (JP)

(73) Assignee: Canon Kabushiki Kaisha, Tokyo (JP)

( * ) Notice: Subject to any disclaimer, the term of this patent is extended or adjusted under 35 U.S.C. 154(b) by 0 days.

(21) Appl. No.: 15/001,602

(22) Filed: Jan. 20, 2016

(65) Prior Publication Data

US 2016/0222239 A1   Aug. 4, 2016

(30) Foreign Application Priority Data

Jan. 29, 2015  (JP) ................. 2015-015404

(51) Int. Cl.
  *C09D 11/40*   (2014.01)
  *C09D 11/322*  (2014.01)
  *C09D 11/102*  (2014.01)

(52) U.S. Cl.
  CPC ............ *C09D 11/40* (2013.01); *C09D 11/102* (2013.01); *C09D 11/322* (2013.01)

(58) Field of Classification Search
  CPC ...... C09D 11/40; C09D 11/102; C09D 11/322
  See application file for complete search history.

(56) References Cited

U.S. PATENT DOCUMENTS

| | | |
|---|---|---|
| 6,402,316 B1 | 6/2002 | Ichinose |
| 6,605,336 B2 | 8/2003 | Ichinose et al. |
| 6,685,999 B2 | 2/2004 | Ichinose et al. |
| 6,686,000 B2 | 2/2004 | Ichinose |
| 6,966,944 B2 | 11/2005 | Shimomura et al. |
| 7,060,335 B2 | 6/2006 | Ichinose |
| 7,297,202 B2 | 11/2007 | Ichinose et al. |
| 7,381,257 B2 | 6/2008 | Takayama et al. |
| 7,615,113 B2 | 11/2009 | Aikawa et al. |
| 7,705,071 B2 | 4/2010 | Nakagawa et al. |
| 7,854,798 B2 | 12/2010 | Udagawa et al. |
| 8,114,208 B2 | 2/2012 | Nakata et al. |
| 8,389,600 B2 | 3/2013 | Suzuki et al. |
| 8,469,504 B2 | 6/2013 | Saito et al. |
| 8,602,546 B2 | 12/2013 | Shimizu et al. |
| 8,602,547 B2 | 12/2013 | Nakata et al. |
| 8,834,621 B2 | 9/2014 | Takebayashi et al. |
| 8,876,962 B2 | 11/2014 | Yamamoto et al. |

(Continued)

FOREIGN PATENT DOCUMENTS

| | | |
|---|---|---|
| JP | 2009-197211 A | 9/2009 |
| JP | 2010-520324 A | 6/2010 |
| JP | 2013-064082 A | 4/2013 |

*Primary Examiner* — Alessandro Amari
*Assistant Examiner* — Yaovi M Ameh
(74) *Attorney, Agent, or Firm* — Fitzpatrick, Cella, Harper & Scinto

(57) ABSTRACT

Provided is an ink set enabling the recording of images that have excellent gloss clarity and bronzing resistance and have suppressed an occurrence of fringe unevenness when a clear ink and a pigment ink are used in combination. The aqueous ink set includes a combination of a first ink containing no coloring material and a second ink containing a coloring material.

14 Claims, 2 Drawing Sheets

(56) References Cited

U.S. PATENT DOCUMENTS

| | | |
|---|---|---|
| 9,187,662 B2 | 11/2015 | Yamamoto et al. |
| 2006/0135647 A1 | 6/2006 | Ichinose et al. |
| 2008/0207805 A1 | 8/2008 | Blease et al. |
| 2010/0034972 A1 | 2/2010 | Mukae et al. |
| 2012/0268518 A1* | 10/2012 | Saito .................... C09D 11/322 347/20 |
| 2013/0324653 A1* | 12/2013 | Bollard .................... C08F 2/18 524/251 |
| 2013/0328973 A1 | 12/2013 | Kakikawa et al. |
| 2014/0078214 A1* | 3/2014 | Mizutani ................ C09D 11/40 347/20 |

\* cited by examiner

INK SET AND INK JET RECORDING METHOD

BACKGROUND OF THE INVENTION

Field of the Invention

The present invention relates to an ink set and an ink jet recording method using the ink set.

Description of the Related Art

In recent years, inks containing pigments as coloring materials (pigment inks) have been widely used in order to record images having higher toughness including gas resistance and light resistance, as the inks used for an ink jet recording method. The pigments are particulate, and thus images recorded with the pigment inks on a recording medium having a glossy surface (what is called glossy papers) unfortunately have insufficient gloss clarity as compared with images recorded with dye inks in which dyes are dissolved in an aqueous medium. The "gloss clarity" is one of the characteristics indicating the sharpness of an image recorded on the surface of a recording medium. For example, an image having low gloss clarity has a blurred appearance, whereas an image having high gloss clarity has a clear appearance. The gloss clarity can be evaluated by a haze value, for example. Specifically, a lower haze value indicates higher gloss clarity.

In addition, images recorded with the pigment ink cause what is called a bronzing phenomenon that light having a different color from that of incident light is reflected. For example, images recorded with a cyan ink containing phthalocyanine may cause a reddish bronzing phenomenon, and images recorded with an ink containing carbon black may cause a yellowish bronzing phenomenon.

To solve these problems, various techniques have been studied. For example, in order to improve the glossiness and to suppress the bronzing phenomenon of images recorded with a pigment ink, an ink set including a clear ink containing a water-soluble resin has been disclosed (Japanese Patent Application Laid-Open No. 2009-197211). Separately, an ink set including a clear ink containing a urethane resin has been disclosed (Japanese Patent Application Laid-Open No. 2013-064082 and Japanese Patent Application Laid-Open No. 2010-520324). The ink set improves the anti-scratching properties or the glossiness of images recorded with a pigment ink.

The inventors of the present invention have used the conventional clear inks described in Patent Documents to study the gloss clarity and the bronzing resistance of images recorded with a pigment ink. The result has revealed that the effects of improving the gloss clarity and the bronzing resistance of images are not achieved at high levels by using any of the clear inks. In addition, a new problem commonly caused when conventional clear inks are used has been found during the above study. Specifically, the newly found problem is that when a clear ink is applied onto the image recorded with a pigment ink, reflected light coloring that differs from the bronzing phenomenon is caused, or glossiness is changed, and "unevenness" is caused in some areas in the image. The "unevenness" is caused by the following mechanism. That is, light is reflected by both the surface of a "pigment layer" constituting an image and the surface of a "resin layer" formed on the "pigment layer" by a resin particle in a clear ink to generate two kinds of reflected light, and the two kinds of reflected light cause an "fringe phenomenon". Hereinafter, the unevenness caused by the above "fringe phenomenon" is called "fringe unevenness".

The problem of "fringe unevenness" caused by using conventional clear inks has not been recognized in Japanese Patent Application Laid-Open No. 2009-197211, 2013-064082 and Japanese Patent Application Laid-Open No. 2010-520324. In other words, the "fringe unevenness" has not been considered and is a new problem. When the ink sets disclosed in Japanese Patent Application Laid-Open No. 2009-197211 and Japanese Patent Application Laid-Open No. 2013-064082 are used, the suppressive effect of the bronzing phenomenon is slightly observed, but the improvement effect of the gloss clarity of images or the suppressive effect of the fringe unevenness cannot be achieved. When the ink set disclosed in Japanese Patent Application Laid-Open No. 2010-520324 is used, the improvement effect of the gloss clarity of images and the suppressive effect of the bronzing phenomenon are slightly observed, but the suppressive effect of the fringe unevenness cannot be achieved.

An object of the present invention is thus to provide an ink set enabling the recording of images that have excellent gloss clarity and bronzing resistance and have suppressed an occurrence of fringe unevenness when a clear ink and a pigment ink are used in combination. Another object of the present invention is to provide an ink jet recording method using the ink set.

SUMMARY OF THE INVENTION

The above object is achieved by the following present invention. That is, the present invention provides an aqueous ink set including a combination of a first ink containing no coloring material and a second ink containing a coloring material. In the aqueous ink set, the first ink contains a resin particle, a water-soluble resin, and a polyether-modified siloxane compound having an HLB value of 5 or more to 14 or less. The second ink contains a water-soluble urethane resin, the coloring material is a pigment, and an acid value $N_1$ (mg KOH/g) of the water-soluble urethane resin in the second ink is 60 mg KOH/g or more smaller than an acid value $N_2$ (mg KOH/g) of the water-soluble resin in the first ink. In the second ink, a mass ratio of a content U (% by mass) of the water-soluble urethane resin relative to a content P (% by mass) of the pigment is 0.10 times or more.

According to the present invention, when a clear ink and a pigment ink are used in combination, an ink set enabling the recording of images that have excellent gloss clarity and bronzing resistance and have suppressed an occurrence of fringe unevenness can be provided. According to the present invention, an ink jet recording method using the ink set can also be provided.

Further features of the present invention will become apparent from the following description of exemplary embodiments with reference to the attached drawings.

BRIEF DESCRIPTION OF THE DRAWINGS

FIG. 2A is a perspective view of a principal part of the ink jet recording apparatus; and FIG. 2B is a perspective view of a head cartridge.

DESCRIPTION OF THE EMBODIMENTS

Preferred embodiments of the present invention will now be described in detail in accordance with the accompanying drawings.

The present invention will now be described in detail with reference to preferred embodiments. An aqueous ink is also simply called "ink". Various physical property values in the present invention are the values determined at 25° C. unless otherwise noted.

In order to record images having excellent gloss clarity and a high suppressive effect of bronzing, it is required to leave a resin in a clear ink on the surface of a pigment layer and to make a highly smooth surface on a resin layer formed by the clear ink. However, it has been found that when conventional clear inks designed on the basis of the above concept are used, the glossiness and the bronzing resistance of images can be improved, but the above-mentioned "fringe unevenness" is markedly caused.

Observation of the surface of images recorded with the conventional clear inks has revealed that marked fringe unevenness is caused between an area where many clear ink dots overlap with each other and an area where small clear ink dots overlap with each other. A cross section of the image recorded with a clear ink and a pigment ink has also been observed. The result has revealed that a "resin layer" of the clear ink formed by the resin particle in the clear ink is formed on a "pigment layer" formed by the pigment ink to form a layered structure in which the pigment layer is clearly separated from the resin layer.

Figure 1:
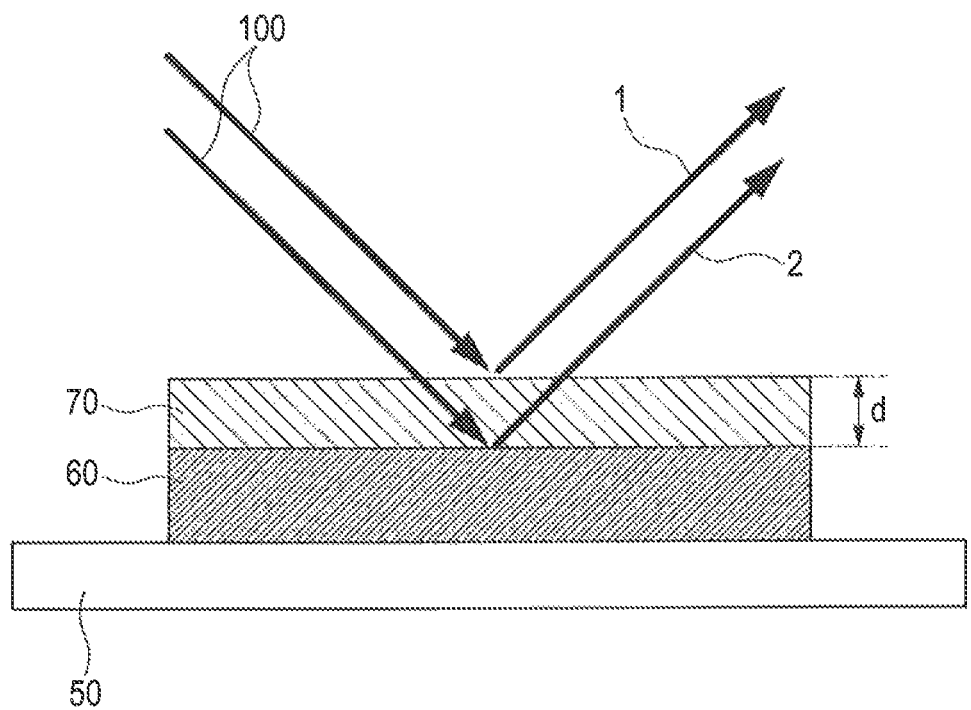
FIG. 1 is a schematic view illustrating a fringe phenomenon.

The inventors of the present invention have studied the cause of the "fringe unevenness" when a conventional clear ink and a pigment ink are used. FIG. 1 is a schematic view illustrating the fringe phenomenon. As shown in FIG. 1, the case in which light (incident light 100) is applied to a recording medium 50 on which an image having a pigment layer 60 and a resin layer 70 formed on the pigment layer 60 is recorded is supposed. If an image has high gloss clarity, some of the incident light 100 is reflected by the outermost surface of the image (the surface of the resin layer 70) to generate reflected light 1. If a clear interface is formed between the pigment layer 60 and the resin layer 70, the incident light 100 passing through the resin layer 70 is also reflected by the interface to generate reflected light 2. As a result, the reflected light 1 and the reflected light 2 cause thin-film fringe, resulting in reflected light coloring that differs from the bronzing phenomenon. The color tone of the interfering light depends on the thickness d of a resin layer, and thus the color tone of the interfering light changes as the dot thickness changes between an area where many clear ink dots overlap with each other and an area where small clear ink dots overlap with each other. This change in color tone is supposed to be markedly observed as the "fringe unevenness".

The inventors of the present invention have supposed that the occurrence of fringe unevenness can be suppressed by suppressing the generation of at least one of the reflected light 1 and the reflected light 2, and have carried out a further study. However, it has been found that when the smoothness on the surface of the resin layer 70 is reduced to suppress the generation of the reflected light 1, the occurrence of fringe unevenness is suppressed, but the gloss clarity of images deteriorate. Hence, the inventors have supposed that if the formation of the interface between the pigment layer 60 and the resin layer 70 can be suppressed, or if the interface can be made unclear, the generation of the reflected light 2 can be suppressed. The inventors have further expected that if a clear ink containing a water-soluble resin is applied onto a pigment layer 60 and some of the water-soluble resin in the clear ink can be allowed to permeate the inside of the pigment layer 60, the interface between the pigment layer 60 and the resin layer 70 is made unclear. It has been found, however, that the method still slightly suppresses the occurrence of fringe unevenness. In addition, the water-soluble resin in the clear ink permeates the pigment layer 60, and thus a smaller amount of the resin is left on the pigment layer 60, resulting in a suppression in bronzing resistance.

Next, the inventors of the present invention have studied a clear ink that contains two types of resins of resin A for suppressing the bronzing phenomenon and resin B for making the interface between a pigment layer and a resin layer unclear. The result has revealed that by combination use of the resin particle as the resin A and a water-soluble resin as the resin B, the bronzing phenomenon can be suppressed, and the interface between a pigment layer and a resin layer can be made unclear. The above result is supposed to be achieved because the water-soluble resin is likely to permeate a pigment layer and the resin particle is likely to be left on a pigment layer. However, the occurrence of fringe unevenness cannot be sufficiently suppressed even by the technique.

Observation of images recorded with the clear ink containing a water-soluble resin and a resin particle has revealed that the water-soluble resin cannot completely permeate the inside of a pigment layer, and some of the water-soluble resin forms a clear interface between a pigment layer and a resin layer. The inventors have supposed the reason why the water-soluble resin in the clear ink is difficult to permeate a pigment layer as follows: The surfaces of pigment particles forming a pigment layer have high hydrophobicity and have a low surface energy. It is supposed that even when a resin dispersant or a hydrophilic group covers the surfaces of pigment particles, some of the particle surfaces are not covered with the hydrophilic group or the like, and the surfaces partially have high hydrophobicity. Highly hydrophobic surfaces of the pigment particles are sparsely scattered in a pigment layer, and thus a clear ink is prevented from permeating the pigment layer. As a result, the clear ink applied onto the pigment layer is stuck on the pigment layer. Concurrently, the clear ink is being dried, and thus the water-soluble resin is solidified on the pigment layer before permeation into the pigment layer. Hence, the inventors have studied a clear ink containing a polyether-modified siloxane compound that is known to be effective in improvement of ink permeability, for helping the clear ink to permeate a pigment layer. It has been found that by using a polyether-modified siloxane compound having an HLB value of 5 or more to 14 or less, the permeability of a clear ink can be increased while the ink ejection stability is maintained, and the occurrence of fringe unevenness is likely to be reduced. The occurrence of fringe unevenness, however, cannot be sufficiently suppressed even by the technique.

Next, the inventors of the present invention have studied the formation of a pigment layer that is easily wetted by a clear ink. Specifically, the inventors have studied the formation of a pigment layer that is easily wetted by a clear ink by using a pigment ink containing a water-soluble urethane resin capable of further increasing the surface energy of a pigment upon interaction with the pigment, as compared with a water-soluble acrylic resin and the like. The result has revealed that recorded images having the occurrence of fringe unevenness suppressed and the level of gloss clarity can be improved. The water-soluble urethane resin typically has a hydrogen-binding moiety represented by a urethane bond and a hydrophobic moiety. When a water-soluble urethane resin is added to a pigment ink, the hydrophobic moieties of the water-soluble urethane resin are arranged so as to surround a pigment. In addition, the hydrogen-binding moiety can increase the surface energy of the pigment. Both the inside and the surface of a pigment layer formed by such a pigment have a higher surface energy. On this account, the pigment ink forms a pigment layer that is easily wetted and is easily permeated. The wettability of a clear ink to the pigment layer is increased, thus the clear ink is helped to spread on the pigment layer, and clear ink dots can be supposed to have a smaller height.

In the pigment ink, the mass ratio of the content U (% by mass) of the water-soluble urethane resin relative to the content P (% by mass) of the pigment is required to be 0.10 times or more. If the mass ratio is less than 0.10 times, the amount of the water-soluble urethane resin for making a pigment layer be easily wetted is insufficient. Accordingly, images having high gloss clarity and suppressed fringe unevenness cannot be recorded.

Even when a clear ink containing a resin particle, a water-soluble resin, and a particular polyether-modified siloxane compound is used, a high level of gloss clarity of images and a high level of suppressive effect of the fringe unevenness still cannot be achieved in some cases depending on the formulation of a pigment ink. The reason has been studied, and it has been found that the effect is reduced when the following phenomenon is caused. When some of the water-soluble urethane resin in a pigment layer is likely to be dissolved in liquid components in a subsequently applied clear ink, the water-soluble urethane resin is likely to move together with the permeation of the clear ink into the pigment layer. Accordingly, the water-soluble urethane resin is unevenly distributed in the pigment layer. For such a reason, the wettability of a clear ink to a pigment layer is reduced, and the improvement effect of the gloss clarity and the suppressive effect of the fringe unevenness are reduced. To suppress the dissolution, the acid value of the water-soluble urethane resin in the pigment ink is designed so as to be 60 mg KOH/g or more smaller than the acid value of the water-soluble resin in the clear ink. When the acid value of the water-soluble urethane resin in the pigment ink greatly differs from the acid value of the water-soluble resin in the clear ink, the gloss clarity of images and the suppressive effect of the fringe unevenness can be achieved without a reduction in wettability of the clear ink to the pigment layer.

<Ink Set>

The ink set of the present invention is an aqueous ink set including a combination of a first ink containing no coloring material and a second ink containing a coloring material. The first ink contains a resin particle, a water-soluble resin, and a polyether-modified siloxane compound having an HLB value of 5 or more to 14 or less. The second ink contains a water-soluble urethane resin, and the coloring material is a pigment. The first ink and the second ink are not required to undergo a reaction or to increase the viscosity when coming in contact with each other. In other words, each ink is not required to contain a reaction agent or a thickener. Components contained in the inks constituting the ink set of the present invention, physical properties of the inks, and the like will next be described in detail.

(Resin Particle)

The first ink constituting the ink set of the present invention contains a resin particle. The resin particle is exemplified by particles formed of a resin such as acrylic resins, olefinic resins, and urethane resins. Specifically, the resin particle formed of an acrylic resin is preferably contained. In particular, a first ink containing the acrylic resin as the water-soluble resin is not required to contain a urethane resin. In the below description, "(meth)acrylic" means "acrylic" and "methacrylic", and "(meth)acrylate" means "acrylate" and "methacrylate". The acrylic resin may be any resin at least having an acrylic component such as units derived from (meth)acrylic acid and units derived from (meth)acrylate esters. More specifically, the resin is preferably a resin having a hydrophilic unit and a hydrophobic unit as constitution units.

The hydrophilic unit (unit having a hydrophilic group such as acid groups and a hydroxy group) can be formed by polymerizing a monomer having a hydrophilic group, for example. Specific examples of the monomer having a hydrophilic group include monomers having a carboxy group, such as (meth)acrylic acid, itaconic acid, maleic acid, and fumaric acid; monomers having a sulfonic acid group, such as styrenesulfonic acid; monomers having a phosphonic acid group, such as ethyl (meth)acrylate-2-phosphonate; anionic monomers such as anhydrides and salts of these acidic monomers; and monomers having a hydroxy group, such as 2-hydroxyethyl (meth)acrylate and 3-hydroxypropyl (meth)acrylate. Examples of the cation constituting the salt of an anionic monomer include a lithium ion, a sodium ion, a potassium ion, an ammonium ion, and organic ammonium ions.

The hydrophobic unit (unit not having a hydrophilic group such as acid groups and a hydroxy group) can be formed by polymerizing a monomer having a hydrophobic group, for example. Specific examples of the monomer having a hydrophobic group include monomers having an aromatic ring, such as styrene, α-methylstyrene, and benzyl (meth)acrylate; and monomers having an aliphatic group, such as ethyl (meth)acrylate, methyl (meth)acrylate, (iso)propyl (meth)acrylate, (n-, iso-, t-)butyl (meth)acrylates, and 2-ethylhexyl (meth)acrylate. It is preferred that the resin particle do not have a unit having a siloxane structure because the gloss clarity of images slightly deteriorate in some cases.

In the present invention, the resin particle having a core-shell structure is preferably used. By using the resin particle having a core-shell structure, images having further excellent gloss clarity and bronzing resistance can be recorded. In the resin particle having a core-shell structure, the core part and the shell part function in clearly different ways. For example, the resin particle having a core part formed from a unit derived from a monomer having a hydrophobic group and having a shell part containing a unit derived from an acidic monomer enable a further improvement of ink ejection stability as compared with the resin particle that has a single layer structure and has the same acid value. In addition, the resin particle having a core part to which a unit derived from a monomer having a hydrophobic group is introduced is advantageously present on a formed pigment layer. Accordingly, the gloss clarity and the bronzing resistance can be further improved.

The resin particle preferably has a volume-average particle size of 50 nm or more to 120 nm or less. If having a volume-average particle size of less than 50 nm, the resin particle is likely to sink in a pigment layer or a recording medium, and thus the gloss clarity and the bronzing resistance are slightly unlikely to be improved in some cases. If the resin particle has a volume-average particle size of more than 120 nm, the gloss clarity of images slightly deteriorate in some cases.

In the present invention, the "volume-average particle size" means a particle size (D50) at an accumulation volume of 50% and can be determined in the following conditions. First, the resin particle is diluted 50-fold (in terms of volume) with pure water to prepare a measurement sample. Then, a particle size distribution analyzer is used, and the volume-average particle size of the resin particle in the measurement sample is determined in accordance with the following measurement conditions.

[Measurement Conditions]
SetZero: 30 seconds
Number of measurements: three times
Measurement time: 180 seconds
Refractive index: 1.5

As the particle size distribution analyzer, a particle size analyzer (for example, trade name "UPA-EX150", manufactured by NIKKISO CO., LTD.) by dynamic light scattering can be used, for example. Needless to say, the particle size distribution analyzer, the measurement conditions, and the like are not limited to the above.

The content (% by mass) of the resin particle in the first ink is preferably 0.20% by mass or more to 5.00% by mass or less based on the total mass of the first ink. If the content of the resin particle in the first ink is less than 0.20% by mass, an intended imaging performance is slightly difficult to achieve in some cases. If the content is more than 5.00% by mass, the ink ejection stability slightly deteriorates in some cases.

(Water-Soluble Resin)

The first ink constituting the ink set of the present invention contains a water-soluble resin. The water-soluble resin is exemplified by acrylic resins, olefinic resins, and urethane resins. Specifically, the acrylic resins are preferred as the water-soluble resin. In particular, a first ink containing the acrylic resin as the water-soluble resin is not required to contain a urethane resin. As with the acrylic resin constituting the resin particle, the acrylic resin may be any resin at least having an acrylic component such as units derived from (meth)acrylic acid and units derived from (meth)acrylate esters. More specifically, the resin is preferably a resin having a hydrophilic unit and a hydrophobic unit as constitution units.

The hydrophilic unit (unit having a hydrophilic group such as acid groups and a hydroxy group) can be formed by polymerizing a monomer having a hydrophilic group, for example. Specific examples of the monomer having a hydrophilic group include monomers having a carboxy group, such as (meth)acrylic acid, itaconic acid, maleic acid, and fumaric acid; monomers having a sulfonic acid group, such as styrenesulfonic acid; monomers having a phosphonic acid group, such as ethyl (meth)acrylate-2-phosphonate; anionic monomers such as anhydrides and salts of these acidic monomers; and monomers having a hydroxy group, such as 2-hydroxyethyl (meth)acrylate and 3-hydroxypropyl (meth)acrylate. Examples of the cation constituting the salt of an anionic monomer include a lithium ion, a sodium ion, a potassium ion, an ammonium ion, and organic ammonium ions. The water-soluble resin typically exhibits water-solubility when being neutralized with a neutralizer such as hydroxides of alkali metals (for example, lithium, sodium, and potassium) and aqueous ammonia.

The hydrophobic unit (unit not having a hydrophilic group such as acid groups and a hydroxy group) can be formed by polymerizing a monomer having a hydrophobic group, for example. Specific examples of the monomer having a hydrophobic group include monomers having an aromatic ring, such as styrene, α-methylstyrene, and benzyl (meth)acrylate; and monomers having an aliphatic group, such as ethyl (meth)acrylate, methyl (meth)acrylate, (iso) propyl (meth)acrylate, (n-, iso-, t-)butyl (meth)acrylates, and 2-ethylhexyl (meth)acrylate.

The content (% by mass) of the water-soluble resin in the first ink is preferably 0.50% by mass or more to 4.00% by mass or less based on the total mass of the first ink. If the content of the water-soluble resin in the first ink is less than 0.50% by mass, an intended imaging performance is slightly difficult to achieve in some cases. If the content is more than 4.00% by mass, the ink ejection stability slightly deteriorates in some cases.

The second ink constituting the ink set of the present invention preferably further contains a second water-soluble resin (except the water-soluble urethane resin described later). In particular, the second ink more preferably contains a second water-soluble resin that is the same resin as the water-soluble resin in the first ink. The same resin means that the types of constitution units of each resin, the acid value, and the weight-average molecular weight are the same. By adding the second water-soluble resin that is the same as the water-soluble resin in the first ink into the second ink, the suppressive effect of the fringe unevenness can be further improved. This is because when the same water-soluble resin is previously present in a pigment layer, the water-soluble resin in the first ink is more likely to be compatible with the pigment layer, and the interface between the pigment layer and a resin layer is more likely to be made unclear. The second water-soluble resin contained in the second ink is preferably a water-soluble acrylic resin, and the water-soluble acrylic resin more preferably has no alkylene oxide structure.

The water-soluble resin preferably has a weight-average molecular weight of 1,000 or more to 30,000 or less and more preferably 3,000 or more to 15,000 or less. The weight-average molecular weight of the water-soluble resin can be determined by size exclusion chromatography (GPC method) in accordance with JIS Handbook, Chemical analysis K0124. The water-soluble resin preferably has an acid value of 100 mg KOH/g or more to 300 mg KOH/g or less. The acid value of the water-soluble resin can be determined by potentiometric titration.

Whether the resin is water-soluble is determined by the following procedure. First, by neutralization with an alkali (such as sodium hydroxide and potassium hydroxide) in an amount corresponding to the acid value, a liquid containing a resin (resin solid content: 10% by mass) is prepared. Next, the prepared liquid is diluted 10-fold (in terms of volume) with pure water to prepare a sample solution. The particle size of the resin in the sample solution is then determined by dynamic light scattering. When the particles having particle sizes are not observed, such a resin can be determined to be water-soluble. The conditions for the measurement are as follows:

[Measurement Conditions]
SetZero: 30 seconds
Number of measurements: three times
Measurement time: 180 seconds As the particle size distribution analyzer, a particle size analyzer (for example, trade name "UPA-EX150", manufactured by NIKKISO CO., LTD.) by dynamic light scattering can be used, for example. Needless to say, the particle size distribution analyzer, the measurement conditions, and the like are not limited to the above.

(Water-Soluble Urethane Resin)

The second ink (pigment ink) constituting the ink set of the present invention contains a water-soluble urethane resin. The pigment layer formed by the second ink containing a pigment and a water-soluble urethane resin is likely to be permeated by the water-soluble resin in the first ink, and thus the fringe unevenness is suppressed. Dots of the first ink also spread, thus the dots can have a smaller height, and images having excellent gloss clarity can be recorded.

The urethane resin is required to be "water-soluble". Whether the urethane resin is water-soluble is specifically determined by the same procedure in the above case of the water-soluble resin. The inventors of the present invention have studied an ink containing a water-insoluble urethane resin in place of the water-soluble urethane resin. The result has revealed that images having excellent gloss clarity or suppressed fringe unevenness cannot be recorded. This is supposed to be because a particulate urethane resin is unlikely to be arranged so as to surround a pigment, and the wettability of the first ink to a pigment layer cannot be effectively improved.

In the second ink, the mass ratio of the content U (% by mass) of the water-soluble urethane resin relative to the content P (% by mass) of the pigment is 0.10 times or more. If the mass ratio is less than 0.10 times, the improvement effect of the gloss clarity or the suppressive effect of the fringe unevenness cannot be achieved. The mass ratio is preferably 0.60 times or less and more preferably 0.20 times or less.

The water-soluble urethane resin can be prepared by reacting a polyisocyanate with a polyol, for example. The water-soluble urethane resin can be prepared by further reacting a chain extender. The water-soluble urethane resin can also be a hybrid resin prepared by bonding a urethane resin to another resin.

As the polyisocyanate, an aliphatic polyisocyanate or an aromatic polyisocyanate can be used, for example. Specific examples of the aliphatic polyisocyanate include polyisocyanates having a chain structure, such as tetramethylene diisocyanate, hexamethylene diisocyanate, dodecamethylene diisocyanate, 2,2,4-trimethylhexamethylene diisocyanate, 2,4,4-trimethylhexamethylene diisocyanate, lysine diisocyanate, 2-methylpentane 1,5-diisocyanate, and 3-methylpentane 1,5-diisocyanate; and polyisocyanates having a cyclic structure, such as isophorone diisocyanate, hydrogenated xylylene diisocyanate, 4,4'-dicyclohexylmethane diisocyanate, 1,4-cyclohexane diisocyanate, methylcyclohexylene diisocyanate, and 1,3-bis(isocyanate methyl) cyclohexane.

Specific examples of the aromatic polyisocyanate include tolylene diisocyanate, 2,2'-diphenylmethane diisocyanate, 2,4'-diphenylmethane diisocyanate, 4,4'-diphenylmethane diisocyanate, 4,4'-dibenzy diisocyanate, 1,5-naphthylene diisocyanate, xylylene diisocyanate, 1,3-phenylene diisocyanate, 1,4-phenylene diisocyanate, dialkyldiphenylmethane diisocyanate, tetraalkyldiphenylmethane diisocyanate, and $\alpha,\alpha,\alpha',\alpha'$-tetramethylxylylene diisocyanate.

As the polyol, long-chain polyols having a number-average molecular weight of about 450 to 4,000, such as polyether polyols, polyester polyols, and polycarbonate polyols; and short-chain polyols such as polyols having a hydrophilic group are usable. As the water-soluble urethane resin, a polyether urethane resin having a poly(oxytetramethylene) structure or a poly(oxypropylene) structure is preferably used. When such a polyether urethane resin is used, the improvement effect of the gloss clarity of images and the suppressive effect of the fringe unevenness can be further improved. The poly(oxytetramethylene) structure or the poly(oxypropylene) structure more strongly interacts with the water-soluble acrylic resin in the first ink. On this account, it is supposed that the wettability of the first ink to a pigment layer increases, and the improvement effect of the gloss clarity of images and the suppressive effect of the fringe unevenness are further improved.

Examples of the polyol having a hydrophilic group as the specific example of the short-chain polyol include polyols having an acid group such as a carboxy group, a sulfonic acid group, and a phosphonic acid group; and polyols having a hydrophilic group such as a carbonyl group and a hydroxy group in the structure thereof. It is particularly preferred to use a water-soluble urethane resin synthesized by further using a polyol having an acid group, such as dimethylolpropionic acid and dimethylolbutanoic acid in addition to the long-chain polyol. The acid group may be a salt form. Examples of the cation constituting the salt include a lithium ion, a sodium ion, a potassium ion, an ammonium ion, and organic ammonium ions. When having an acid group, the water-soluble urethane resin typically exhibits water-solubility by neutralizing the acid group with a neutralizer such as hydroxides of alkali metals (for example, lithium, sodium, and potassium) and aqueous ammonia.

The chain extender is a compound capable of reacting with a remaining isocyanate group that fails to form a urethane bond among the polyisocyanate units in the urethane prepolymer prepared by reacting a polyisocyanate and a polyol. As the chain extender, polyvalent amines such as dimethylol ethylamine, ethylenediamine, and diethylenetriamine; polyvalent imines such as polyethylene polyimine; and polyhydric alcohols such as neopentyl glycol and butylethylpropanediol are usable.

The acid value $N_1$ (mg KOH/g) of the water-soluble urethane resin in the second ink is required to be 60 mg KOH/g or more smaller than the acid value $N_2$ (mg KOH/g) of the water-soluble resin in the first ink. In other words, the acid value $N_1$ (mg KOH/g) of the water-soluble urethane resin in the second ink and the acid value $N_2$ (mg KOH/g) of the water-soluble resin in the first ink satisfy the relation, $N_2-N_1 \geq 60$. If the relation, $N_2-N_1 \geq 60$, is not satisfied, the improvement effect of the gloss clarity or the suppressive effect of the fringe unevenness cannot be achieved. The difference ($N_2-N_1$) between the acid value $N_1$ (mg KOH/g) of the water-soluble urethane resin in the second ink and the acid value $N_2$ (mg KOH/g) of the water-soluble resin in the first ink is preferably 200 mg KOH/g or less.

The water-soluble urethane resin preferably has an acid value of 45 mg KOH/g or more to 70 mg KOH/g or less. If the water-soluble urethane resin has an acid value of less than 45 mg KOH/g, the wettability of the first ink to a pigment layer cannot be sufficiently improved, and thus the suppressive effect of the fringe unevenness is slightly reduced in some cases. If the water-soluble urethane resin has an acid value of more than 70 mg KOH/g, the water-soluble urethane resin has excessively high hydrophilicity, thus the first ink also has excessively high wettability to a pigment layer, and the suppressive effect of the fringe unevenness is slightly reduced in some cases.

The water-soluble urethane resin preferably has a weight-average molecular weight of 8,000 or more to 22,000 or less. If having a weight-average molecular weight of less than 8,000, the water-soluble urethane resin has an excessively small size, and the interaction with the pigment may become weak. Accordingly, the wettability of the first ink to a pigment layer cannot be increased, and the suppressive effect of the fringe unevenness is reduced in some cases. If having a weight-average molecular weight of more than 22,000, the water-soluble urethane resin has an excessively large size. Accordingly, the interaction between the water-soluble urethane resin and a pigment increases, but the gaps among pigment particles forming a pigment layer are filled with the water-soluble urethane resin, and thus the permeation of the first ink is suppressed. As a result, the improvement effect of the gloss clarity and the suppressive effect of the fringe unevenness are reduced in some cases.

(Polyether-Modified Siloxane Compound)

The first ink constituting the ink set of the present invention contains a polyether-modified siloxane compound having an HLB value of 5 or more to 14 or less. By adding the polyether-modified siloxane compound to the first ink, the permeation of the first ink into a pigment layer is accelerated, and the fringe unevenness can be suppressed. If the polyether-modified siloxane compound has an HLB value of less than 5, the first ink ejection stability becomes low, and the improvement effect of the gloss clarity, the suppressive effect of the bronzing phenomenon, or the suppressive effect of the fringe unevenness cannot be achieved. If the polyether-modified siloxane compound has an HLB value of more than 14, the suppressive effect of the fringe unevenness cannot be achieved.

In the present invention, the "polyether-modified siloxane compound" is a compound having a polydimethylsiloxane skeleton in the molecular structure thereof and further having a polyether chain (for example, polyethylene oxide and polypropylene oxide). In the present invention, the "HLB value" is a value determined by Griffin's method. The HLB value by Griffin's method can be calculated in accordance with Expression (1) from the formula weight of a hydrophilic group (ethylene oxide group) of the polyether-modified siloxane compound and the molecular weight. The HLB value calculated by Griffin's method is a physical property value indicating the degree of hydrophilicity or lipophilicity of a compound and is a value ranging from 0 to 20. A smaller HLB value indicates higher lipophilicity, and a larger HLB value indicates higher hydrophilicity.

HLB value=20×formula weight of hydrophilic group of polyether-modified siloxane compound/molecular weight of polyether-modified siloxane compound    (1)

The polyether-modified siloxane compound is preferably a compound represented by General Formula (2). By using a compound represented by General Formula (2), the fringe unevenness can be further suppressed. In General Formula (2), ($C_2H_4O$) represents an ethylene oxide unit, and ($C_3H_6O$) represents a propylene oxide unit. In the molecular structure, the ethylene oxide units and the propylene oxide units may be present in a random manner or in a block manner. Here, units "being present in a random manner" means that ethylene oxide units and propylene oxide units are arranged irregularly. Units "being present in a block manner" means that blocks configured to include a plurality of units are arranged regularly.

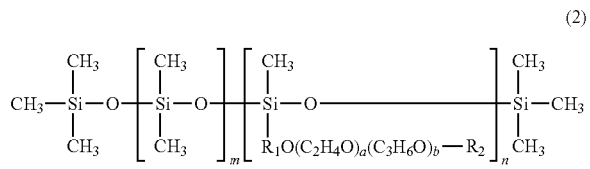

(2)

(In General Formula (2), $R_1$ is an alkylene group having 1 or more to 20 or less carbon atoms; $R_2$ is a hydrogen atom or an alkyl group having 1 or more to 20 or less carbon atoms; m is a number of 1 or more to 350 or less; n is a number of 1 or more to 100 or less; a is a number of 1 or more to 100 or less; and b is a number of 0 or more to 100 or less)

In General Formula (2), $R_1$ is preferably an alkylene group having 1 or more to 10 or less carbon atoms and more preferably an ethylene group, a propylene group, or a butylene group. $R_2$ is preferably an alkyl group having 1 or more to 10 or less carbon atoms and more preferably a methyl group, an ethyl group, or a propyl group. m is preferably a number of 1 or more to 250 or less and more preferably a number of 1 or more to 100 or less. n is preferably a number of 1 or more to 50 or less. Specifically, preferably used is a compound of General Formula (2) in which m is 40 or more to 80 or less, n is 3 or more to 7 or less, a is 15 or more to 30 or less, b is 0, $R_1$ is a propylene group, and $R_2$ is a methyl group because the fringe unevenness is particularly effectively suppressed.

The compound represented by General Formula (2) can be synthesized, for example, by addition reaction of two compounds represented by the following formulae to add an alkenyl group to a hydrogen atom of a polysiloxane. In the following formulae, m is a number of 1 or more to 350 or less, n is a number of 1 or more to 100 or less, a is a number of 1 or more to 100 or less, b is a number of 0 or more to 100 or less, and R is an alkenyl group having 1 or more to 20 or less carbon atoms.

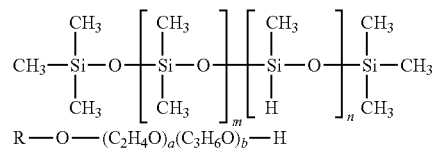

In the first ink, the content (% by mass) of the polyether-modified siloxane compound having an HLB value of 5 or more to 14 or less is preferably 0.05% by mass or more to 2.00% by mass or less based on the total mass of the first ink. The content is more preferably 0.10% by mass or more to 1.50% by mass or less.

(Coloring Material)

The second ink constituting the ink set of the present invention contains a pigment as a coloring material. The pigment is exemplified by inorganic pigments such as carbon black and organic pigments, which are well-known in the art. The pigment is preferably dispersed in the second ink by a water-soluble resin that functions as a resin dispersant. The content (% by mass) of the pigment in the second ink is preferably 0.05% by mass or more to 15.00% by mass or less and more preferably 0.10% by mass or more to 10.00% by mass or less based on the total mass of the second ink. The pigment in the second ink preferably has a volume-average particle size $D_2$ (nm) of 50 nm or more to 250 nm or less and more preferably 80 nm or more to 150 nm or less. The volume-average particle size of the pigment can be determined in the same conditions as for the resin particle.

The ratio of the volume-average particle size $D_1$ (nm) of the resin particle in the first ink relative to the volume-average particle size $D_2$ (nm) of the pigment in the second ink is preferably 0.6 times or more to 1.2 times or less. In other words, the volume-average particle size $D_1$ (nm) of the resin particle in the first ink and the volume-average particle size $D_2$ (nm) of the pigment in the second ink preferably satisfy the relation, $0.6 \le D_1/D_2 \le 1.2$. By adjusting the $D_1/D_2$ value within the above numerical range, the resin particle can be present on a pigment layer in a more appropriate condition, and thus a higher improvement effect of the gloss clarity and a higher suppressive effect of the fringe unevenness can be achieved. If the $D_1/D_2$ value is less than 0.6 times, the resin particle has an excessively small size as compared with the pigment particles, and some of the resin particle may infiltrate in gaps formed in a pigment layer. On this account, an appropriate amount of the resin particle is not allowed to be present on a pigment layer in some cases, and the improvement effect of the gloss clarity and the suppressive effect of the bronzing phenomenon may be reduced. If the $D_1/D_2$ value is more than 1.2 times, the resin particle has an excessively large size as compared with the size of unevenness on a pigment layer, thus the unevenness cannot be filled appropriately, and the improvement effect of the gloss clarity is reduced in some cases.

(Aqueous Medium)

Each ink constituting the ink set of the present invention is an aqueous ink containing an aqueous medium that is a mixed solvent of water and a water-soluble organic solvent. As the water, a deionized water (ion-exchanged water) is preferably used. The content (% by mass) of water in the ink is preferably 50.00% by mass or more to 95.00% by mass or less and more preferably 70.00% by mass or more to 90.00% by mass or less based on the total mass of the ink.

The water-soluble organic solvent may be any water-soluble solvent, and can be an alcohol, a polyhydric alcohol, a polyglycol, a glycol ether, a nitrogen-containing polar solvent, or a sulfur-containing polar solvent, for example. However, it is preferred that alkanediols having poor water solubility and having about 7 or more carbon atoms be not used because the ink ejection stability slightly deteriorates in some cases. The content (% by mass) of the water-soluble organic solvent in the ink is preferably 3.00% by mass or more to 50.00% by mass or less and more preferably 15.00% by mass or more to 40.00% by mass or less based on the total mass of the ink. If the content of the water-soluble organic solvent is out of the range, a high level of ink ejection stability cannot be sufficiently achieved in some cases.

(Other Additives)

Each ink constituting the ink set of the present invention can contain water-soluble organic compounds that are solid at normal temperature, including polyhydric alcohols such as trimethylolpropane and trimethylolethane and urea and derivatives thereof as necessary in addition to the above-mentioned components. However, if a wax particle-like solid component such as polyolefin particles is contained, the gloss clarity of images slightly deteriorate in some cases, and thus the ink preferably does not contain such a solid component. Each ink constituting the ink set of the present invention can also contain various additives such as surfactants, pH adjusters, anticorrosives, antiseptic agents, antifungal agents, antioxidants, reduction inhibitors, evaporate accelerators, chelating agents, and other water-soluble resins as necessary.

(Physical Properties of Ink)

The first ink preferably has a dynamic surface tension at a lifetime of 50 ms of 30 mN/m or more to 35 mN/m or less. The first ink preferably has a static surface tension of 25 mN/m or more to 30 mN/m or less. By satisfying these requirements, a much higher improvement effect of the gloss clarity and a much higher suppressive effect of the fringe unevenness can be achieved. As described above, in order to improve the suppressive effect of the fringe unevenness, it is important to increase the permeability of the first ink to a pigment layer. Hence, the inventors have focused attention on the surface tension of the first ink. First, a plurality of first inks prepared to have various dynamic surface tensions were applied onto a pigment layer, and dots of the first inks were observed. The result has revealed that when the dynamic surface tension is 35 mN/m or less at 50 ms after application of the first ink at which the first ink is permeating a pigment layer, the permeation is particularly accelerated. This is supposed to be because dots of the first ink applied to a pigment layer rapidly spread and are helped to permeate the pigment layer, and accordingly the improvement effect of the gloss clarity and the suppressive effect of the fringe unevenness are further improved. If the first ink has a dynamic surface tension at 50 ms of less than 30 mN/m, the ink ejection deteriorates in some cases, and the improvement effect of the gloss clarity, the suppressive effect of the bronzing phenomenon, and the suppressive effect of the fringe unevenness are likely to be reduced.

The inventors of the present invention have applied first inks prepared to have dynamic surface tensions at 50 ms of 30 mN/m or more to 35 mN/m or less and to have various static surface tensions, and have observed dots of the first inks. The result has revealed that the permeation is particularly accelerated when the first ink has a static surface tension of 25 mN/m or more to 30 mN/m or less. This is thought to be because the balance between the capillary force of a pigment layer to the first ink (force of a pigment layer absorbing the first ink) and the above-described wetting and spreading of the first ink on a pigment layer is appropriate in the gaps in a pigment layer. If the first ink has a static surface tension of less than 25 mN/m, the capillary force of a pigment layer to the first ink deteriorates, and the permeability of the first ink deteriorates. Accordingly, a high level of improvement effect of the gloss clarity and a high level of suppressive effect of the fringe unevenness are not achieved in some cases. If the first ink has a static surface tension of more than 30 mN/m, the wettability of the first ink to a pigment layer deteriorates, and the permeability of the first ink deteriorates. Accordingly, a high level of improvement effect of the gloss clarity and a high level of suppressive effect of the fringe unevenness are not achieved in some cases.

The dynamic surface tension used for specifying the characteristics of the ink in the present invention is determined by a maximum bubble pressure method. The maximum bubble pressure method is a method in which a maximum pressure required for discharging a bubble formed at a tip of a probe (thin tube) immersed in a liquid to be measured and a surface tension of the liquid is determined from the maximum pressure. The maximum pressure is measured while bubbles are continuously formed at the tip of the probe. For the measurement, the time from a point at which a fresh bubble surface is formed at the tip of a probe to a point at which a maximum bubble pressure is obtained (a point at which the curvature radius of a bubble becomes the same as the radius of the tip of the probe) is called lifetime. The static surface tension used for specifying the characteristics of the ink in the present invention is determined by a plate method. The dynamic surface tension and the static surface tension can be adjusted, for example, by the type and the amount of the water-soluble organic solvent or the surfactant.

The second ink preferably has a dynamic surface tension at a lifetime of 50 ms of 30 mN/m or more to 40 mN/m or less. The second ink preferably has a static surface tension of 25 mN/m or more to 40 mN/m or less.

<Ink Jet Recording Method>

An ink jet recording method of the present invention is a method of ejecting each ink contained in the above-described ink set of the present invention from an ink jet recording head to record an image on a recording medium. The system for ejecting the ink is exemplified by a system of applying mechanical energy to the ink and a system of applying thermal energy to the ink. The ink jet recording method of the present invention preferably includes a step of applying the first ink onto an image recorded with the second ink. In the present invention, a system of applying thermal energy to an ink to eject the ink is particularly preferably adopted. The ink jet recording method includes known steps except that each ink contained the ink set of the present invention is used.

Figure 2A:
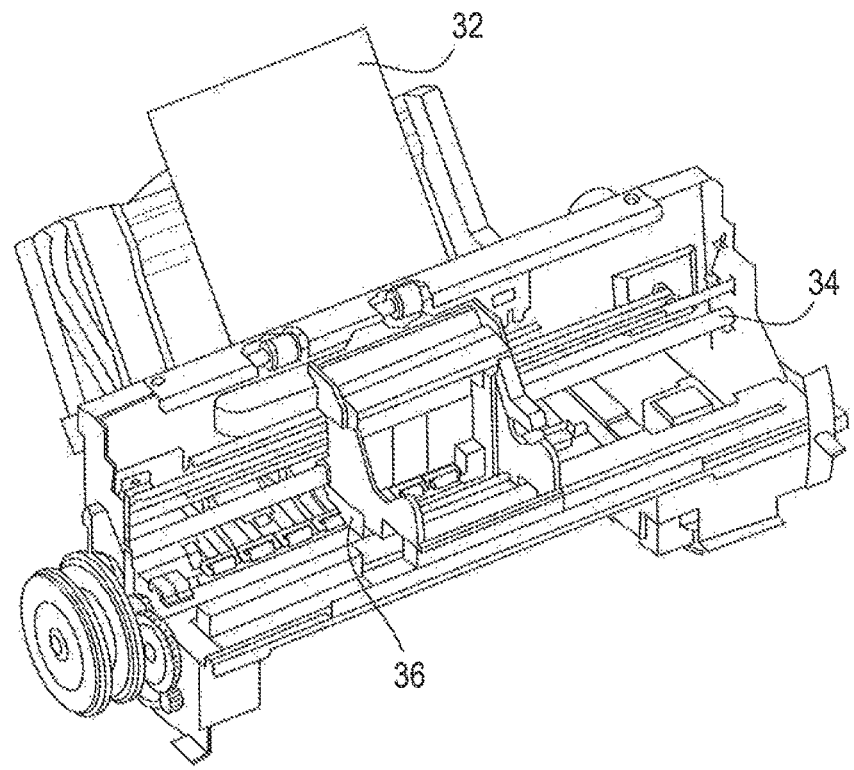
FIGS. 2A and 2B are schematic views illustrating an exemplary ink jet recording apparatus used for an ink jet recording method of the present invention.
Figure 2B:
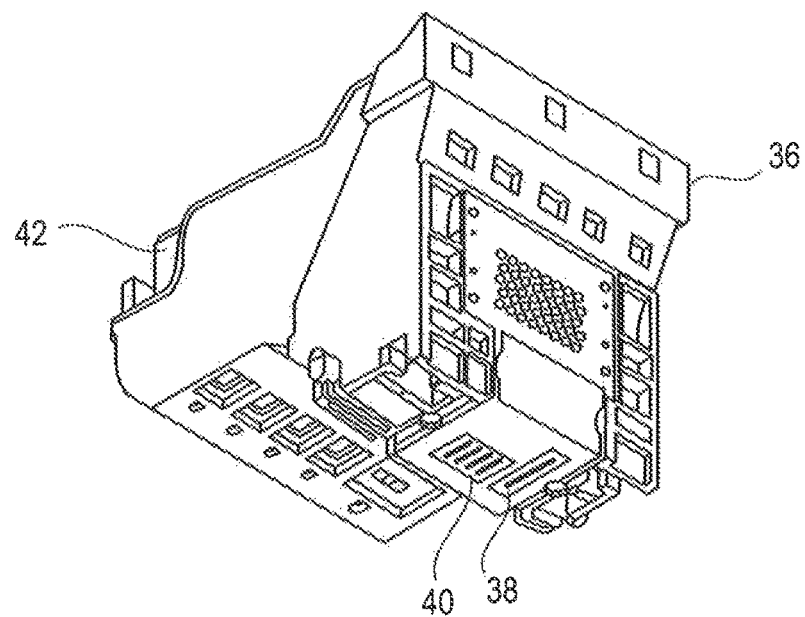

FIGS. 2A and 2B are schematic views illustrating an exemplary ink jet recording apparatus used for an ink jet recording method of the present invention; FIG. 2A is a perspective view of a principal part of the ink jet recording apparatus; and FIG. 2B is a perspective view of a head cartridge. In the ink jet recording apparatus, a conveyance unit (not illustrated) for conveying a recording medium 32 and a carriage shaft 34 are provided. A head cartridge 36 can be installed on the carriage shaft 34. The head cartridge 36 is provided with recording heads 38 and 40 and is so constructed that an ink cartridge 42 is set. Inks (not illustrated) are ejected toward the recording medium 32 from the recording heads 38 and 40 while the head cartridge 36 is being carried in a main scanning direction along the carriage shaft 34. The recording medium 32 is then conveyed in a sub scanning direction by the conveyance unit (not illustrated), whereby an image is recorded on the recording medium 32.

The recording medium to be recorded by using the ink set of the present invention may be any recording medium but is preferably a paper having permeability, such as plain paper and recording media having a coating layer (glossy paper and art paper, for example). It is particularly preferred to use the recording medium having a coating layer that allows at least some of pigment particles in the ink to be present on the surface of the recording medium or on the vicinity thereof. Such a recording medium can be selected depending on an intended purpose of the record on which an image is recorded. Example of the recording medium include glossy papers that are suitable for giving images having glossiness of photographic image quality and art papers that take advantage of substrate textures (for example, a drawing paper-like texture, a canvas-like texture, and a Japanese paper-like texture) in order to express preferred images such as pictures, photographs, and graphic images. Specifically, what is called a glossy paper having a glossy surface of a coating layer is particularly preferably used.

EXAMPLES

The present invention will next be described in further detail with reference to examples and comparative examples, but the invention is not intended to be limited to the following examples without departing from the scope of the invention. The component amounts with "part" or "%" are based on mass unless otherwise noted.

<Measurement Conditions of Volume-Average Particle Size>

The volume-average particle size of a pigment was determined by the following procedure. A pigment was diluted with pure water so as to give a pigment dispersion liquid having a pigment content of 0.4% as a measurement sample, and the measurement sample was subjected to measurement by using a particle size distribution analyzer in accordance with the following measurement conditions. The particle size distribution analyzer used was trade name, "UPA-EX150" (manufactured by NIKKISO CO., LTD.).

[Measurement Conditions]
SetZero: 30 seconds
Number of measurements: three times
Measurement time: 180 seconds
Refractive index: 1.5

<Preparation of Resin Particle>

In a four-necked flask equipped with a stirrer, a reflux condenser, and a nitrogen inlet tube, 100.0 parts of ethylene glycol monobutyl ether was placed, and nitrogen gas was introduced. The solvent was stirred and the temperature was increased to 110° C. A mixture of 38.0 parts of 2-ethylhexyl acrylate, 34.0 parts of methyl methacrylate, and 28.0 parts of acrylic acid and a solution of 1.3 parts of t-butyl peroxide (polymerization initiator) in ethylene glycol monobutyl ether were added dropwise over 3 hours. After aging for 2 hours, the ethylene glycol monobutyl ether was removed under reduced pressure, giving a solid resin (shell polymer). To the obtained shell polymer, potassium hydroxide in an amount equivalent to the acid value and an appropriate amount of ion-exchanged water were added, and the shell polymer was neutralized and dissolved at 80° C., giving an aqueous shell polymer solution having a solid content (shell polymer content) of 30.0%. The shell polymer had an acid value of 216 mg KOH/g and a weight-average molecular weight of 15,000.

In a four-necked flask equipped with a stirrer, a reflux condenser, and a nitrogen inlet tube, the aqueous shell polymer solution in an amount shown in Table 1 was placed, then nitrogen gas was introduced, and the temperature was increased to 80° C. under stirring. A mixture of styrene and methyl methacrylate at 4:1 (mass ratio) and water in amounts shown in Table 1 were added, and then a solution of 1.0 part of potassium persulfate (polymerization initiator) in 16.7 parts of water was added dropwise over 3 hours. After aging for 2 hours, an appropriate amount of ion-exchanged water was added to adjust the solid content. This operation gave an aqueous dispersion having a resin content (solid content) of 10.0% and containing a resin particle having a core-shell structure. The volume-average particle size of the resin particle was determined by the following procedure. The aqueous dispersion containing the resin particle was diluted 10-fold (in terms of volume) with pure water to prepare a sample for measurement. The volume-average particle size of the resin particle in the obtained sample was determined by dynamic light scattering with a particle size analyzer (trade name "UPA-EX50", manufactured by NIKKISO CO., LTD.) in conditions of a SetZero of 30 seconds, a number of measurements of three times, a measurement time of 180 seconds, and a refractive index of 1.5. The volume-average particle sizes of the resin particle are shown in Table 1.

TABLE 1

Synthetic conditions and characteristics of resin particle 1 to 5

| Resin particle | Aqueous shell polymer solution (part) | Mixture (part) | Water (part) | Volume-average particle size (nm) |
| --- | --- | --- | --- | --- |
| 1 | 40.0 | 8.0 | 52.0 | 90 |
| 2 | 22.0 | 4.4 | 73.6 | 48 |
| 3 | 26.0 | 5.2 | 68.8 | 54 |
| 4 | 58.0 | 11.6 | 30.4 | 108 |
| 5 | 66.0 | 13.2 | 20.8 | 120 |

<Synthesis of Water-Soluble Resin>
(Acrylic Resin 1)

In a four-necked flask equipped with a stirrer, a reflux condenser, and a nitrogen inlet tube, 100.0 parts of ethylene glycol monobutyl ether was placed, and nitrogen gas was introduced into the reaction system. The solvent was stirred and the temperature was increased to 110° C. A mixture of 39.5 parts of styrene, 40.0 parts of methyl methacrylate, and 20.5 parts of acrylic acid and a solution of 1.3 parts of t-butyl peroxide (polymerization initiator) in ethylene glycol monobutyl ether were added dropwise over 3 hours. After aging for 2 hours, the ethylene glycol monobutyl ether was removed under reduced pressure, giving a solid water-soluble resin. To the obtained water-soluble resin, potassium hydroxide in an amount equivalent to the acid value and an appropriate amount of ion-exchanged water were added, and the resin was neutralized and dissolved at 80° C. This operation gave an aqueous solution of acrylic resin 1 (water-soluble acrylic resin) having a resin content (solid content) of 10.0%. The acrylic resin 1 had an acid value of 155 mg KOH/g and a weight-average molecular weight of 8,000.

(Acrylic Resin 2)

An aqueous solution of acrylic resin 2 (water-soluble acrylic resin) having a resin content (solid content) of 10.0% was obtained in the same manner as for the above acrylic resin 1 except that the monomers were changed to a mixture of 79.3 parts of benzyl methyl methacrylate and 20.7 parts of methacrylic acid. The acrylic resin 2 had an acid value of 135 mg KOH/g and a weight-average molecular weight of 7,160.

(Acrylic Resin 3)

In a flask equipped with a stirrer, a nitrogen inlet tube, a condenser, and a thermometer, nitrogen gas was introduced, and 2.57 g of 2,2'-azobis(2,4-dimethylvaleronitrile) (catalyst) and 278 g of methanol were placed. A mixture of 41.28 g of styrene, 153.01 g of methoxypolyethylene glycol acrylate (trade name "Lightacrylate 130A", manufactured by Kyoeisha Chemical Co., Ltd., m=9) represented by Formula (3), and 5.71 g of acrylic acid was added. The temperature of the reaction system was increased from room temperature to 70° C. over 30 minutes, and the mixture was polymerized at 70° C. for 5 hours. A solution of 1.07 g of 2,2'-azobis(2, 4-dimethylvaleronitrile) (catalyst) in methanol (10 g) was added, and the resulting mixture was further polymerized for 3 hours. The temperature of the reaction system was cooled to room temperature, and 13.18 g of 5 mol/L aqueous sodium hydroxide solution was added under stirring. Distilled water was then added while methanol was removed with an evaporator, giving an aqueous crude polymer solution. The obtained aqueous crude polymer solution was subjected to ultrafiltration to remove impurities, and the filtrate was concentrated. This operation gave acrylic resin 3 (water-soluble acrylic resin) as a random copolymer having a formulation of (poly(styrene-co-methoxypolyethylene glycol acrylate-co-sodium acrylate)). To the resin, an appropriate amount of pure water was added to give an aqueous solution of the acrylic resin 3 having a resin content (solid content) of 10.0%. The acrylic resin 3 had an acid value of 62 mg KOH/g and a weight-average molecular weight of 22,000.

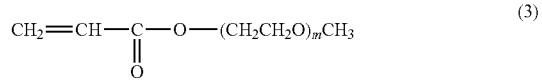

(3)

(Acrylic Resin 4)

In a flask equipped with a stirrer, a nitrogen inlet tube, a condenser, and a thermometer, nitrogen gas was introduced, and 3,587 g of vinyl acetate, a chain transfer agent, and 1,907 g of chloroform were placed. The temperature of the reaction system was increased from room temperature to 70° C. over 1 hour, and then a solution of 0.3 g of azobis(2-methylbutyronitrile) (catalyst) in chloroform (534 g) was added dropwise over 6 hours. A solution of 0.5 g of azobis(2-methylbutyronitrile) (catalyst) in chloroform (444.5 g) was added dropwise over 5 hours. The mixture was polymerized for 10 hours under heat and reflux conditions. The unreacted vinyl acetate and chloroform were then removed under reduced pressure at an inner temperature of 40° C. while 0.01 mol/L sodium hydroxide solution in methanol was continuously added dropwise, giving a methanol solution of polyvinyl acetate having a resin content (solid content) of 74%.

In a flask equipped with a stirrer, a nitrogen inlet tube, a condenser, and a thermometer, nitrogen gas was introduced. In the flask, 17 g of methanol, 1,048.5 g of isopropyl alcohol, 2,623 g of methyl acrylate, 2,142 g of benzyl methacrylate, 63.5 g of styrene, and 1,353 g of polyvinyl acetate (macroinitiator) solution in methanol were placed. The temperature of the reaction system was increased from room temperature to 60° C. over 1 hour. When the temperature reached 60° C., a solution of 0.6 g of cuprous bromide (catalyst) and 12.0 g of tris(2-dimethylamino)ethylamine (ligand) in methanol (30 g) was added. The mixture was then polymerized for 30 hours under heat and reflux conditions, giving a reacted solution.

In a reactor equipped with a stirrer, a condenser, and a thermometer, a mixed solvent of 276 g of methanol, 552 g of tetrahydrofuran, and 138 g of water was placed. Next, 502 g of the above-obtained reacted solution was added and dissolved, and the temperature was increased to 60° C. Then, 728 g of 5 mol/L aqueous sodium hydroxide solution was added, and the mixture was reacted at 65° C. for 7 hours. To the resin precipitation obtained by removing the supernatant liquid, 550 g of tetrahydrofuran and 140 g of water were added to suspend the precipitation, and 280 g of methanol was added to precipitate the resin. The supernatant liquid was removed once again, then 300 g of water was added, and the resulting mixture was neutralized with acetic acid. The resulting mixture was heated to 90° C. to remove the tetrahydrofuran and methanol, and the residual liquid was subjected to ultrafiltration to remove impurities. The filtrate was concentrated, giving acrylic resin 4 as a block copolymer having a formulation of polyvinyl alcohol-b-poly(sodium acrylate-co-methyl acrylate-co-sodium methacrylate-co-benzyl methacrylate-co-styrene). To the resin, an appropriate amount of pure water was added to give an aqueous solution of the acrylic resin 4 (water-soluble acrylic resin) having a resin content (solid content) of 10.0%. The acrylic resin 4 had an acid value of 208 mg KOH/g and a weight-average molecular weight of 22,300.

<Synthesis of Water-Soluble Urethane Resin>
(Urethane Resins 1 to 7)

In a four-necked flask equipped with a thermometer, a stirrer, a nitrogen inlet tube, and a condenser, poly(propylene) glycol having a number average molecular weight of 1,000 in an amount shown in Table 2, 44.5 g of isophorone diisocyanate, and 0.007 g of dibutyltin dilaurate were placed. Under a nitrogen gas atmosphere, the mixture was reacted at a temperature of 100° C. for 5 hours and then cooled to a temperature of 65° C. or less. Dimethylolpropionic acid in an amount shown in Table 2, 3.0 g of neopentyl glycol, and 150.0 g of methyl ethyl ketone were added, and the resulting mixture was reacted at a temperature of 80° C. Then, the reaction mixture was cooled to a temperature of 40° C., and 20.0 g of methanol was added to stop the reaction. Next, an appropriate amount of ion-exchanged water was added, and an aqueous potassium hydroxide solution required for neutralizing the resin was added while the mixture was stirred with a homomixer. Then, the methyl ethyl ketone and the unreacted methanol were distilled off under heat and reduced pressure, giving aqueous solutions of water-soluble urethane resins each having a resin content (solid content) of 10.0%. The acid value of the urethane resin was determined by using an automatic potential-difference titrator by potentiometric titration with a potassium hydroxide/ethanol titration solution. The weight-average molecular weight (in terms of polystyrene) of the urethane resin was determined by gel permeation chromatography. The weight-average molecular weight was adjusted by appropriately changing the reaction time at a temperature of 80° C. The acid value and the weight-average molecular weight in terms of polystyrene of each urethane resin are shown in Table 2. The abbreviations of the monomers in Table 2 are as shown below. The numerical value with an abbreviation represents the number average molecular weight of a polyol.

PPG: polypropylene glycol
DMPA: dimethylolpropionic acid

TABLE 2

Synthetic conditions and characteristics of urethane resins

| Urethane resin | Amount (g) of monomer | | Characteristics | |
|---|---|---|---|---|
| | PPG1000 | DMPA | Acid value (mgKOH/g) | Weight-average molecular weight |
| 1 | 25.0 | 27.5 | 115 | 8,000 |
| 2 | 39.3 | 13.2 | 55 | 15,000 |
| 3 | 29.7 | 22.8 | 95 | 10,000 |
| 4 | 39.3 | 13.2 | 55 | 7,000 |
| 5 | 39.3 | 13.2 | 55 | 8,000 |
| 6 | 39.3 | 13.2 | 55 | 22,000 |
| 7 | 39.3 | 13.2 | 55 | 23,000 |
| 8 | 39.3 | 13.2 | 55 | 23,000 |

(Urethane Resin 8)

Urethane resin 8 as a water-soluble urethane resin described in Japanese Patent Application Laid-Open No. 2010-520324 and synthesized by using isophorone diisocyanate, polyhexamethylene carbonate diol, and 2,2-bis(hydroxymethyl)propionic acid was prepared. To the urethane resin 8, potassium hydroxide in an amount equivalent to the acid value and an appropriate amount of ion-exchanged water were added, and the resin was neutralized and dissolved at 80° C. This operation gave an aqueous solution of the urethane resin 8 having a resin content (solid content) of 10.0%. The urethane resin 8 had an acid value of 76 mg KOH/g and a weight-average molecular weight of 26,100.

(Determination Whether a Resin is Water-Soluble)

The aqueous water-soluble resin (acrylic resin, urethane resin) solutions obtained above were diluted with pure water to prepare samples each having a resin content (solid content) of 1.0%. The particle size of the resin in the obtained sample was determined by dynamic light scattering with a particle size analyzer (trade name "UPA-EX150", manufactured by NIKKISO CO., LTD.) in conditions of a SetZero of 30 seconds, a number of measurements of three times, and a measurement time of 180 seconds. As a result, no particle size was determined in each resin, and this revealed that each resin was water-soluble.

<Synthesis of Polyether-Modified Siloxane Compound>

In a glass container equipped with a thermometer and a stirrer, a polysiloxane compound represented by Formula (A) and a polyoxyalkylene compound represented by Formula (B) were placed. The compounds were subjected to addition reaction in the presence of a platinum catalyst, and compounds (polyether-modified siloxane compounds) represented by General Formula (2) were synthesized. The characteristics of the synthesized compounds are shown in Table 3. Here, m, n, $R_1$, $R_2$, a, and b in Formulae (A) and (B) correspond m, n, $R_1$, $R_2$, a, and b in General Formula (2) representing the structure of each compound synthesized, respectively.

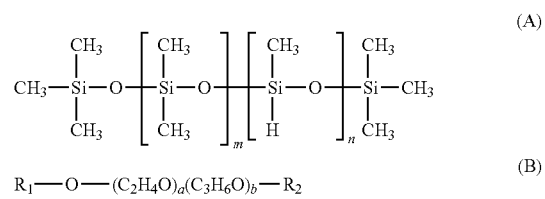

$$R_1-O-(C_2H_4O)_a(C_3H_6O)_b-R_2 \quad (B)$$

TABLE 3

Characteristics of compounds represented by Formula (2)

| Compound | m | n | $R_1$ | $R_2$ | a | b | HLB (theoretical value) |
|---|---|---|---|---|---|---|---|
| 1 | 70 | 5 | $CH_2=CH-CH_2-$ | $CH_3$ | 20 | 0 | 9 |
| 2 | 80 | 3 | $CH_2=CH-CH_2-$ | $CH_3$ | 16 | 0 | 5 |
| 3 | 40 | 7 | $CH_2=CH-CH_2-$ | $CH_3$ | 27 | 0 | 14 |
| 4 | 110 | 3 | $CH_2=CH-CH_2-$ | $CH_3$ | 16 | 0 | 4 |
| 5 | 40 | 7 | $CH_2=CH-CH_2-$ | $CH_3$ | 36 | 0 | 15 |
| 6 | 40 | 4 | $CH_2=CH-CH_2-$ | $CH_3$ | 9 | 0 | 6 |
| 7 | 3 | 2 | $CH_2=CH-CH_2-$ | $CH_3$ | 11 | 0 | 13 |
| 8 | 0 | 1 | $CH_2=CH-CH_2-$ | $CH_3$ | 12 | 0 | 13 |

<Preparation of Pigment Dispersion Liquid>

Each resin dispersant used for preparing the following pigment dispersion liquids 1 to 3 was neutralized with sodium hydroxide in an amount equivalent to the acid value to prepare a sample having a resin content (solid content) of 1.0%. The particle size of the resin in the obtained sample was determined by dynamic light scattering with a particle size analyzer (trade name "UPA-EX150", manufactured by NIKKISO CO., LTD.) in conditions of a SetZero of 30 seconds, a number of measurements of three times, and a measurement time of 180 seconds. As a result, no particle size was determined, and this revealed that the resin was water-soluble.

(Pigment Dispersion Liquid 1)

A mixture of 15.0 parts of pigment (C.I. Pigment Blue 15:3), 50.0 parts of aqueous resin dispersant solution, and 70.0 parts of ion-exchanged water was placed in a batch type vertical sand mill (manufactured by Aimex) and dispersed for 3 hours. The aqueous resin dispersant solution used was prepared by neutralizing a styrene-acrylic acid copolymer as a water-soluble acrylic resin having an acid value of 210 mg KOH/g and a weight-average molecular weight of 8,000 with an aqueous sodium hydroxide solution in such an amount as to be 0.95 equivalent of the acid value. The aqueous resin dispersant solution had a resin content (solid content) of 20.0%. Then, the aqueous resin dispersant solution was centrifuged to remove non-dispersed components including coarse particles. Next, the mixture was subjected to pressure filtration through a cellulose acetate filter with a pore size of 3.0 m (manufactured by ADVANTEC), giving a pigment dispersion liquid 1 having a pigment content of 10.0% and a resin dispersant content (solid content) of 6.0%. The pigment in the pigment dispersion liquid 1 had a volume-average particle size of 90 nm.

(Pigment Dispersion Liquid 2)

Pigment dispersion liquid 2 having a pigment content of 10.0% and a resin dispersant content (solid content) of 6.0% was prepared in the same manner as for the pigment dispersion liquid 1 except that the pigment type was changed to C.I. Pigment Red 122. The pigment in the pigment dispersion liquid 2 had a volume-average particle size of 100 nm.

(Pigment Dispersion Liquid 3)

First, 28.0 g of pigment (C.I. Pigment Blue 15:3), 84.2 g of solution having a resin content (solid content) of 13.3% and prepared by concentrating the aqueous solution of acrylic resin 3, 14.0 g of aqueous solution of acrylic resin 4, and 153.8 g of deionized water were mixed. The mixture was pre-dispersed with a homomixer for 60 minutes and then further dispersed with a bead mill containing zirconia beads having a diameter of 0.3 mmϕ at 25° C. for 7 hours and at 40° C. for 1 hour. The beads were removed, and then the concentration was adjusted to give a dispersion liquid having a pigment content of 10.0%. The obtained dispersion liquid was placed in a tall beaker having a capacity of 500 mL in an ice bath and was dispersed with a ultrasonic homogenizer (trade name "US-600T", manufactured by NIHONSEIKI KAISHA LTD, chips with a diameter of 36 mmϕ were used) for 120 minutes. This operation gave pigment dispersion liquid 3 having a pigment content of 10.0% and a resin dispersant content (solid content) of 3.0%. The pigment in the pigment dispersion liquid 3 had a volume-average particle size of 105 nm.

<Preparation of Ink>

Components (unit: %) shown in upper rows in Tables 4-1, 4-2, 5-1, and 5-2 were mixed and thoroughly stirred, and the resulting mixture was subjected to pressure filtration through a cellulose acetate filter with a pore size of 0.8 μm (manufactured by ADVANTEC), giving each ink. Lower rows in Tables 4-1, 4-2, 5-1, and 5-2 show characteristics of the inks. The dynamic surface tension at a lifetime of 50 ms was determined at 25° C. with a dynamic surface tensiometer (trade name "BUBBLE PRESSURE TENSIOMETER BP-2", manufactured by KRUSS) by the maximum bubble pressure method. The static surface tension was determined at 25° C. by using an automatic surface tensiometer (trade name "DY-300", manufactured by Kyowa Interface Science Co., Ltd.).

The details of components and the like in Tables 4-1, 4-2, 5-1, and 5-2 are shown below.

RESAMINE D-1060: a water-insoluble urethane resin (a self-emulsifiable polyurethane emulsion, manufactured by Dainichiseika Color & Chemicals Mfg. Co., Ltd., a resin content [solid content] of 40.0%, a resin particle having a volume-average particle size of 150 nm)

CHEMIPEARL W4005: a polyethylene wax (manufactured by Mitsui Chemicals, Inc., a particle size of 200 to 800 nm, a ring and ball softening point of 110° C., a penetration hardness of 4, a solid content of 40%)

Microgel particles: an aqueous suspension (a resin content (solid content) of 20.0%) of a resin particle having a volume-average particle size of 79 nm and formed from a methyl methacrylate/divinylbenzene/methacrylic acid copolymer.

Acetylenol E 60: a surfactant (an ethylene oxide adduct of acetylene glycol) (manufactured by Kawaken Fine Chemicals)

Acetylenol E 100: a surfactant (an ethylene oxide adduct of acetylene glycol) (manufactured by Kawaken Fine Chemicals)

Tergitol 15-S-5: a nonionic surfactant (a linear alcohol ethoxylate) (manufactured by Union Carbide Corp.)

Surfynol 465: an acetylene glycol type surfactant (manufactured by Air Products and Chemicals)

TABLE 4-1

Formulations and characteristics of first inks

| | I-1 | I-2 | I-3 | I-4 | I-5 | I-6 | I-7 | I-8 | I-9 | I-10 | I-11 | I-12 |
|---|---|---|---|---|---|---|---|---|---|---|---|---|
| Aqueous dispersion of resin particle 1 | 20.00 | 20.00 | 20.00 | 20.00 | | | | | 20.00 | 20.00 | 20.00 | 20.00 |
| Aqueous dispersion of resin particle 2 | | | | | 20.00 | | | | | | | |
| Aqueous dispersion of resin particle 3 | | | | | | 20.00 | | | | | | |
| Aqueous dispersion of resin particle 4 | | | | | | | 20.00 | | | | | |
| Aqueous dispersion of resin particle 5 | | | | | | | | 20.00 | | | | |
| RESAMINE D-1060 | | | | | | | | | | | | |
| CHEMIPEARL W4005 | | | | | | | | | | | | |
| Microgel particles | | | | | | | | | | | | |
| Aqueous solution of acrylic resin 1 | 20.00 | | 20.00 | 20.00 | 20.00 | 20.00 | 20.00 | 20.00 | 20.00 | 20.00 | 20.00 | 20.00 |
| Aqueous solution of acrylic resin 2 | | | | | | | | | | | | |
| Aqueous solution of acrylic resin 3 | | | | | | | | | | | | |
| Aqueous solution of urethane resin 1 | | 20.00 | | | | | | | | | | |
| Aqueous solution of urethane resin 8 | | | | | | | | | | | | |
| Compound 1 | 1.00 | 1.00 | | | 1.00 | 1.00 | 1.00 | 1.00 | 1.00 | 1.00 | 1.00 | 1.00 |
| Compound 2 | | | 1.00 | | | | | | | | | |
| Compound 3 | | | | 1.00 | | | | | | | | |

TABLE 4-1-continued

Formulations and characteristics of first inks

| | I-1 | I-2 | I-3 | I-4 | I-5 | I-6 | I-7 | I-8 | I-9 | I-10 | I-11 | I-12 |
|---|---|---|---|---|---|---|---|---|---|---|---|---|
| Compound 4 | | | | | | | | | | | | |
| Compound 5 | | | | | | | | | | | | |
| Compound 6 | | | | | | | | | | | | |
| Compound 7 | | | | | | | | | | | | |
| Compound 8 | | | | | | | | | | | | |
| Glycerol | 7.00 | 7.00 | 7.00 | 7.00 | 7.00 | 7.00 | 7.00 | 7.00 | 7.00 | 7.00 | 7.00 | 7.00 |
| Ethylene glycol | | | | | | | | | | | | |
| Triethylene glycol | 5.00 | 5.00 | 5.00 | 5.00 | 5.00 | 5.00 | 5.00 | 5.00 | 5.00 | 5.00 | 5.00 | 5.00 |
| Dipropylene glycol | | | | | | | | | | | | |
| 1,2-Hexanediol | 3.00 | 3.00 | 3.00 | 3.00 | 3.00 | 3.00 | 3.00 | 3.00 | 3.00 | 2.00 | 3.00 | 4.00 |
| 1,6-Hexanediol | | | | | | | | | | | | |
| 1,2-Octanediol | | | | | | | | | | | | |
| 1,2,6-Hexanetriol | | | | | | | | | | | | |
| 2-Pyrrolidone | | | | | | | | | | | | |
| Acetylenol E 60 | 0.10 | 0.10 | 0.10 | 0.10 | 0.10 | 0.10 | 0.10 | 0.10 | 0.12 | 0.12 | 0.04 | 0.02 |
| Acetylenol E 100 | 0.50 | 0.50 | 0.50 | 0.50 | 0.50 | 0.50 | 0.50 | 0.50 | 0.50 | 0.50 | 0.50 | 0.50 |
| Tergitol 15-S-5 | | | | | | | | | | | | |
| Water | 43.40 | 43.40 | 43.40 | 43.40 | 43.40 | 43.40 | 43.40 | 43.40 | 43.38 | 44.38 | 43.46 | 42.48 |
| Dynamic surface tension at a lifetime of 50 ms (mN/m) | 32 | 32 | 32 | 32 | 32 | 32 | 32 | 32 | 29 | 30 | 35 | 36 |
| Static surface tension (mN/m) | 27 | 27 | 27 | 27 | 27 | 27 | 27 | 27 | 25 | 25 | 30 | 30 |

TABLE 4-2

Formulations and characteristics of first inks

| | I-13 | I-14 | I-15 | I-16 | I-17 | I-18 | I-19 | I-20 | I-21 | I-22 | I-23 | I-24 |
|---|---|---|---|---|---|---|---|---|---|---|---|---|
| Aqueous dispersion of resin particle 1 | 20.00 | 20.00 | 20.00 | | | 20.00 | 20.00 | 20.00 | 20.00 | | | |
| Aqueous dispersion of resin particle 2 | | | | 20.00 | | | | | | | | |
| Aqueous dispersion of resin particle 3 | | | | | | | | | | | | |
| Aqueous dispersion of resin particle 4 | | | | | | | | | | | | |
| Aqueous dispersion of resin particle 5 | | | | | | | | | | | | |
| RESAMINE D-1060 | | | | | | | | | | | 10.00 | |
| CHEMIPEARL W4005 | | | | | | | | | | | 5.00 | |
| Microgel particles | | | | | | | | | | | | 20.00 |
| Aqueous solution of acrylic resin 1 | 20.00 | 20.00 | 20.00 | 20.00 | 20.00 | | 20.00 | 20.00 | 20.00 | | | |
| Aqueous solution of acrylic resin 2 | | | | | | | | | | | | 8.00 |
| Aqueous solution of acrylic resin 3 | | | | | | | | | | 20.00 | | |
| Aqueous solution of urethane resin 1 | | | | | | | | | | | | |
| Aqueous solution of urethane resin 8 | | | | | | | | | | | | 24.00 |
| Compound 1 | 1.00 | 1.00 | 1.00 | 1.00 | 1.00 | 1.00 | | | | | | |
| Compound 2 | | | | | | | | | | | | |
| Compound 3 | | | | | | | | | | | | |
| Compound 4 | | | | | | | | 1.00 | | | | |
| Compound 5 | | | | | | | | | 1.00 | | | |
| Compound 6 | | | | | | | | | | | 0.10 | |
| Compound 7 | | | | | | | | | | | 0.10 | |
| Compound 8 | | | | | | | | | | | 0.10 | |
| Glycerol | 7.00 | 7.00 | 7.00 | 7.00 | 7.00 | 7.00 | 7.00 | 7.00 | 7.00 | 7.50 | 5.00 | 12.00 |
| Ethylene glycol | | | | | | | | | | | | 6.00 |
| Triethylene glycol | 5.00 | 5.00 | 5.00 | 5.00 | 5.00 | 5.00 | 5.00 | 5.00 | 5.00 | | | |
| Dipropylene glycol | | | | | | | | | | | 5.00 | |
| 1,2-Hexanediol | 4.00 | 1.00 | 3.00 | 3.00 | 3.00 | 3.00 | 3.00 | 3.00 | 3.00 | | 1.00 | |
| 1,6-Hexanediol | | | | | | | | | | 5.00 | | |
| 1,2-Octanediol | | | | | | | | | | | 2.50 | |
| 1,2,6-Hexanetriol | | | | | | | | | | | 5.00 | |
| 2-Pyrrolidone | | | | | | | | | | 5.00 | | |
| Acetylenol E 60 | 0.14 | 0.12 | 0.02 | 0.02 | 0.10 | 0.10 | 0.10 | 0.10 | 0.10 | | | |
| Acetylenol E 100 | 0.50 | 0.50 | 0.50 | 0.50 | 0.50 | 0.50 | 0.50 | 0.50 | 0.50 | 1.00 | | |
| Tergitol 15-S-5 | | | | | | | | | | | | 1.00 |

TABLE 4-2-continued

Formulations and characteristics of first inks

|  | I-13 | I-14 | I-15 | I-16 | I-17 | I-18 | I-19 | I-20 | I-21 | I-22 | I-23 | I-24 |
|---|---|---|---|---|---|---|---|---|---|---|---|---|
| Water | 42.36 | 45.38 | 43.48 | 43.48 | 63.40 | 63.40 | 44.40 | 43.40 | 43.40 | 61.50 | 66.20 | 29.00 |
| Dynamic surface tension at a lifetime of 50 ms (mN/m) | 30 | 31 | 35 | 36 | 32 | 32 | 32 | 32 | 32 | 32 | 32 | 40 |
| Static surface tension (mN/m) | 24 | 25 | 31 | 30 | 27 | 27 | 27 | 27 | 27 | 27 | 27 | 30 |

TABLE 5-1

Formulations acid characteristics of second inks

|  | II-1 | II-2 | II-3 | II-4 | II-5 | II-6 | II-7 | II-8 | II-9 |
|---|---|---|---|---|---|---|---|---|---|
| Pigment dispersion liquid 1 | 30.00 |  | 30.00 | 30.00 | 30.00 | 30.00 | 30.00 | 30.00 | 30.00 |
| Pigment dispersion liquid 2 |  | 30.00 |  |  |  |  |  |  |  |
| Pigment dispersion liquid 3 |  |  |  |  |  |  |  |  |  |
| RESAMINE D-1060 |  |  |  |  |  |  |  |  |  |
| CHEMIPEARL W4005 |  |  |  |  |  |  |  |  |  |
| Aqueous solution of acrylic resin 1 | 10.00 | 10.00 | 10.00 | 10.00 | 10.00 |  | 10.00 | 10.00 | 10.00 |
| Aqueous solution of acrylic resin 2 |  |  |  |  |  |  |  |  |  |
| Aqueous solution of acrylic resin 3 |  |  |  |  |  |  |  |  |  |
| Aqueous solution of acrylic resin 4 |  |  |  |  |  | 10.00 |  |  |  |
| Aqueous solution of urethane resin 1 |  |  |  |  |  |  |  |  |  |
| Aqueous solution of urethane resin 2 | 5.00 | 5.00 | 3.00 | 17.00 |  | 5.00 |  |  |  |
| Aqueous solution of urethane resin 3 |  |  |  |  | 5.00 |  |  |  |  |
| Aqueous solution of urethane resin 4 |  |  |  |  |  |  | 5.00 |  |  |
| Aqueous solution of urethane resin 5 |  |  |  |  |  |  |  | 5.00 |  |
| Aqueous solution of urethane resin 6 |  |  |  |  |  |  |  |  | 5.00 |
| Aqueous solution of urethane resin 7 |  |  |  |  |  |  |  |  |  |
| Aqueous solution of urethane resin 8 |  |  |  |  |  |  |  |  |  |
| Glycerol | 7.00 | 7.00 | 7.00 | 7.00 | 7.00 | 7.00 | 7.00 | 7.00 | 7.00 |
| Ethylene glycol |  |  |  |  |  |  |  |  |  |
| Triethylene glycol | 5.00 | 5.00 | 5.00 | 5.00 | 5.00 | 5.00 | 5.00 | 5.00 | 5.00 |
| Dipropylene glycol |  |  |  |  |  |  |  |  |  |
| 1,2-Hexanediol | 3.00 | 3.00 | 3.00 | 3.00 | 3.00 | 3.00 | 3.00 | 3.00 | 3.00 |
| 1,6-Hexanediol |  |  |  |  |  |  |  |  |  |
| 1,2-Octanediol |  |  |  |  |  |  |  |  |  |
| 1,2,6-Hexanetriol |  |  |  |  |  |  |  |  |  |
| 2-Pyrrolidone |  |  |  |  |  |  |  |  |  |
| Acetylenol E 100 | 0.50 | 0.50 | 0.50 | 0.50 | 0.50 | 0.50 | 0.50 | 0.50 | 0.50 |
| Surfynol 465 |  |  |  |  |  |  |  |  |  |
| Water | 39.50 | 39.50 | 41.50 | 27.50 | 39.50 | 39.50 | 39.50 | 39.50 | 39.50 |
| Content P (%) of pigment | 3.00 | 3.00 | 3.00 | 3.00 | 3.00 | 3.00 | 3.00 | 3.00 | 3.00 |
| Content U (%) of urethane resin | 0.50 | 0.50 | 0.30 | 1.70 | 0.50 | 0.50 | 0.50 | 0.50 | 0.50 |
| U/P value | 0.17 | 0.17 | 0.10 | 0.57 | 0.17 | 0.17 | 0.17 | 0.17 | 0.17 |

TABLE 5-2

Formulations and characteristics of second inks

|  | II-10 | II-11 | II-12 | II-13 | II-14 | II-15 | II-16 | II-17 | II-18 |
|---|---|---|---|---|---|---|---|---|---|
| Pigment dispersion liquid 1 | 30.00 | 30.00 | 30.00 | 30.00 | 30.00 | 30.00 |  | 30.00 | 30.00 |
| Pigment dispersion liquid 2 |  |  |  |  |  |  |  |  |  |
| Pigment dispersion liquid 3 |  |  |  |  |  |  | 30.00 |  |  |
| RESAMINE D-1060 |  |  |  |  |  |  |  | 5.00 |  |
| CHEMIPEARL W4005 |  |  |  |  |  |  |  |  | 5.00 |
| Aqueous solution of acrylic resin 1 | 10.00 |  |  | 10.00 | 10.00 | 10.00 |  |  |  |
| Aqueous solution of acrylic resin 2 |  | 10.00 | 10.00 |  |  |  |  |  | 9.00 |
| Aqueous solution of acrylic resin 3 |  |  |  |  |  |  | 10.00 |  |  |
| Aqueous solution of acrylic resin 4 |  |  |  |  |  |  | 1.00 |  |  |
| Aqueous solution of urethane resin 1 |  |  |  |  |  | 5.00 |  |  |  |
| Aqueous solution of urethane resin 2 |  | 5.00 |  |  | 2.00 |  |  |  |  |
| Aqueous solution of urethane resin 3 |  |  |  |  |  |  |  |  |  |
| Aqueous solution of urethane resin 4 |  |  | 5.00 |  |  |  |  |  |  |
| Aqueous solution of urethane resin 5 |  |  |  |  |  |  |  |  |  |
| Aqueous solution of urethane resin 6 |  |  |  |  |  |  |  |  |  |
| Aqueous solution of urethane resin 7 | 5.00 |  |  |  |  |  |  |  |  |

TABLE 5-2-continued

Formulations and characteristics of second inks

|  | II-10 | II-11 | II-12 | II-13 | II-14 | II-15 | II-16 | II-17 | II-18 |
|---|---|---|---|---|---|---|---|---|---|
| Aqueous solution of urethane resin 8 |  |  |  |  |  |  |  |  | 24.00 |
| Glycerol | 7.00 | 7.00 | 7.00 | 7.00 | 7.00 | 7.00 | 7.50 | 5.00 | 7.50 |
| Ethylene glycol |  |  |  |  |  |  |  |  | 4.50 |
| Triethylene glycol | 5.00 | 5.00 | 5.00 | 5.00 | 5.00 | 5.00 |  |  |  |
| Dipropylene glycol |  |  |  |  |  |  |  | 3.00 |  |
| 1,2-Hexanediol | 3.00 | 3.00 | 3.00 | 3.00 | 3.00 | 3.00 |  | 1.00 |  |
| 1,6-Hexanediol |  |  |  |  |  |  | 5.00 |  |  |
| 1,2-Octanediol |  |  |  |  |  |  |  | 2.50 |  |
| 1,2,6-Hexanetriol |  |  |  |  |  |  |  | 2.50 |  |
| 2-Pyrrolidone |  |  |  |  |  |  | 5.00 |  |  |
| Acetylenol E 100 | 0.50 | 0.50 | 0.50 | 0.50 | 0.50 | 0.50 | 1.00 |  |  |
| Surfynol 465 |  |  |  |  |  |  |  |  | 0.75 |
| Water | 39.50 | 39.50 | 39.50 | 44.50 | 42.50 | 39.50 | 40.50 | 46.00 | 24.25 |
| Content P (%) of pigment | 3.00 | 3.00 | 3.00 | 3.00 | 3.00 | 3.00 | 3.00 | 3.00 | 3.00 |
| Content U (%) of urethane resin | 0.50 | 0.50 | 0.50 | 0.00 | 0.20 | 0.50 | 0.00 | 0.00 | 2.40 |
| U/P value | 0.17 | 0.17 | 0.17 | 0.00 | 0.07 | 0.17 | 0.00 | 0.00 | 0.80 |

<Evaluation>

Inks shown in Table 6 were combined to prepare ink sets, and the following evaluations were carried out. "Relation of $N_1$ and $N_2$" in the table 6, the symbol "○" satisfies the relation of "$N_2-N_1 \geq 60$" and the symbol "x" does not satisfy the relation of "$N_2-N_1 \geq 60$". "Relation of $D_1$ and $D_2$" in the table 6, the symbol "○" satisfies the relation of "$0.6 \leq D_1/D_2 \leq 1.2$" and the symbol "x" does not satisfy the relation of "$0.6 \leq D_1/D_2 \leq 1.2$". Ink cartridges filled with the inks were installed in an ink jet recording apparatus equipped with a recording head that ejects inks by thermal energy (trade name "PIXUS Pro 9500", manufactured by Canon). The first ink was set to the position for a mat black ink, and the second ink was set to the position for a cyan ink. Then, 10 types of secondary color solid images were recorded with the second ink at a recording duty ranging from 10 to 100% at intervals of 10%, and an image was recorded with the first ink to overlap with each solid image so as to give a recording duty of 20%. The recording medium used was trade name, "Canon Photo Paper Plus Glossy" (manufactured by Canon) was used. In Example 26, images were recorded in such a condition that the second ink was applied onto the first ink. In Examples, the image recorded in conditions in which eight ink drops each having a weight of 3.5 ng are applied to a unit area of 1/600 inch×1/600 inch at a resolution of 600 dpi×600 dpi is defined as "a recording duty of 100%". In the present invention, a sample evaluated as "A" or "B" was regarded as an acceptable level, and a sample evaluated as "C" was regarded as an unacceptable level based on the following criteria of each item.

(Gloss Clarity)

A micro-haze meter (manufactured by BYK Gardner) was used, and the haze values of the obtained solid images were determined. The average of the haze values was calculated, and the gloss clarity of images were evaluated based on the following criteria.

A: The average haze value was less than 15.
B: The average haze value was 15 or more to less than 20.
C: The average haze value was 20 or more.

(Bronzing Resistance)

The obtained solid images were visually observed, and the bronzing resistance of the images were evaluated based on the following criteria.

A: No bronzing phenomenon was caused.
B: A slight bronzing phenomenon was caused.
C: The bronzing phenomenon was markedly caused.

(Fringe Unevenness)

The bronzing phenomenon states of the obtained solid images were visually observed, and the fringe unevenness of the images were evaluated based on the following criteria.

A: No fringe unevenness was caused.
B: A slight fringe unevenness was caused.
C: The Fringe unevenness was markedly caused.

TABLE 6

Constitution and evaluation results of ink sets

| | | Constitution of ink set | | | | Evaluation results | | |
|---|---|---|---|---|---|---|---|---|
| | | First ink | Second ink | Relation of $N_1$ and $N_2$ | Relation of $D_1$ and $D_2$ | Gloss clarity | Bronzing resistance | Fringe unevenness |
| Example | 1 | I-1 | II-1 | ○ | ○ | A | A | A |
| | 2 | I-2 | II-1 | ○ | ○ | A | A | A |
| | 3 | I-1 | II-2 | ○ | ○ | A | A | A |
| | 4 | I-3 | II-1 | ○ | ○ | A | A | A |
| | 5 | I-4 | II-1 | ○ | ○ | A | A | A |
| | 6 | I-1 | II-3 | ○ | ○ | A | A | A |
| | 7 | I-1 | II-4 | ○ | ○ | A | A | A |
| | 8 | I-1 | II-5 | ○ | ○ | A | A | A |
| | 9 | I-1 | II-6 | ○ | ○ | A | A | A |
| | 10 | I-5 | II-1 | ○ | X | A | B | A |

TABLE 6-continued

Constitution and evaluation results of ink sets

| | | Constitution of ink set | | | Evaluation results | | |
|---|---|---|---|---|---|---|---|
| | | First ink | Second ink | Relation of $N_1$ and $N_2$ | Relation of $D_1$ and $D_2$ | Gloss clarity | Bronzing resistance | Fringe unevenness |
| | 11 | I-6 | II-1 | ○ | ○ | A | A | A |
| | 12 | I-7 | II-1 | ○ | ○ | A | A | A |
| | 13 | I-8 | II-1 | ○ | X | B | A | A |
| | 14 | I-1 | II-7 | ○ | ○ | A | A | B |
| | 15 | I-1 | II-8 | ○ | ○ | A | A | A |
| | 16 | I-1 | II-9 | ○ | ○ | A | A | A |
| | 17 | I-1 | II-10 | ○ | ○ | B | A | B |
| | 18 | I-1 | II-11 | ○ | ○ | A | A | B |
| | 19 | I-9 | II-1 | ○ | ○ | B | B | B |
| | 20 | I-10 | II-1 | ○ | ○ | A | A | A |
| | 21 | I-11 | II-1 | ○ | ○ | A | A | A |
| | 22 | I-12 | II-1 | ○ | ○ | B | A | B |
| | 23 | I-13 | II-1 | ○ | ○ | B | A | B |
| | 24 | I-14 | II-1 | ○ | ○ | A | A | A |
| | 25 | I-15 | II-1 | ○ | ○ | B | A | B |
| | 26 | I-1 | II-1 | ○ | ○ | B | A | A |
| | 27 | I-16 | II-12 | ○ | ○ | B | B | B |
| Comparative Example | 1 | I-17 | II-1 | ○ | ○ | A | C | A |
| | 2 | I-18 | II-1 | ○ | ○ | A | C | C |
| | 3 | I-19 | II-1 | ○ | ○ | A | A | C |
| | 4 | I-20 | II-1 | ○ | ○ | C | C | C |
| | 5 | I-21 | II-1 | ○ | ○ | A | A | C |
| | 6 | I-1 | II-13 | X | ○ | C | A | C |
| | 7 | I-1 | II-14 | ○ | ○ | C | A | C |
| | 8 | I-1 | II-15 | X | ○ | C | A | C |
| | 9 | I-22 | II-16 | X | X | C | B | C |
| | 10 | I-23 | II-17 | X | X | C | B | C |
| | 11 | I-24 | II-18 | X | ○ | B | B | C |

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2015-015404, filed Jan. 29, 2015, which is hereby incorporated by reference herein in its entirety.

What is claimed is:

1. An aqueous ink set comprising:
a combination of a first ink including no coloring material and a second ink including a coloring material,
wherein the first ink is applied onto an image recorded with the second ink,
wherein the first ink includes a resin particle, a water-soluble resin, and a polyether-modified siloxane compound having an HLB value of 5 or more to 14 or less,
wherein the second ink includes a water-soluble urethane resin,
wherein the coloring material is a pigment,
wherein an acid value $N_1$ (mg KOH/g) of the water-soluble urethane resin in the second ink is 60 mg KOH/g or more less than an acid value $N_2$ (mg KOH/g) of the water-soluble resin in the first ink, and
wherein, in the second ink, a mass ratio of a content U (% by mass) of the water-soluble urethane resin relative to a content P (% by mass) of the pigment is 0.10 times or more.

2. The ink set according to claim 1, wherein a ratio of a volume-average particle size $D_1$ (nm) of the resin particle in the first ink relative to a volume-average particle size $D_2$ (nm) of the pigment in the second ink is 0.6 times or more to 1.2 times or less.

3. The ink set according to claim 1, wherein the water-soluble urethane resin in the second ink has a weight-average molecular weight of 8,000 or more to 22,000 or less.

4. The ink set according to claim 1, wherein the second ink further contains a second water-soluble resin that is the same as the water-soluble resin in the first ink.

5. The ink set according to claim 1, wherein the first ink has a dynamic surface tension at a lifetime of 50 ms of 30 mN/m or more to 35 mN/m or less, and the first ink has a static surface tension of 25 mN/m or more to 30 mN/m or less.

6. The ink set according to claim 1, wherein the difference ($N_2-N_1$) between the acid value $N_1$ (mg KOH/g) of the water-soluble urethane resin in the second ink and the acid value $N_2$ (mg KOH/g) of the water-soluble resin in the first ink is 200 mg KOH/g or less.

7. The ink set according to claim 1, wherein, in the second ink, the mass ratio of the content U (% by mass) of the water-soluble urethane resin relative to the content P (% by mass) of the pigment is 0.60 times or less.

8. The ink set according to claim 1, wherein the content (% by mass) of the resin particle in the first ink is 0.20% by mass or more to 5.00% by mass or less based on the total mass of the first ink.

9. The ink set according to claim 1, wherein the content (% by mass) of the water-soluble resin in the first ink is 0.50% by mass or more to 4.00% by mass or less based on the total mass of the first ink.

10. The ink set according to claim 1, wherein the content (% by mass) of the polyether-modified siloxane compound having the HLB value of 5 or more to 14 or less is 0.05% by mass or more to 2.00% by mass or less based on the total mass of the first ink.

11. The ink set according to claim 1, wherein the content (% by mass) of the pigment in the second ink is 0.05% by mass or more to 15.00% by mass or less based on the total mass of the second ink.

12. The ink set according to claim 1, wherein the acid value $N_2$ (mg KOH/g) of the water-soluble resin in the first ink is 100 mg KOH/g or more to 300 mg KOH/g or less.

13. The ink set according to claim 1, wherein the acid value $N_1$ (mg KOH/g) of the water-soluble urethane resin in the second ink is 45 mg KOH/g or more to 70 mg KOH/g or less.

14. An ink jet recording method comprising:
ejecting inks from an ink jet recording head to record an image on a recording medium, wherein the inks are inks included in an aqueous ink set comprising:
a combination of a first ink including no coloring material and a second ink including a coloring material,
wherein the first ink includes a resin particle, a water-soluble resin, and a polyether-modified siloxane compound having an HLB value of 5 or more to 14 or less,
wherein the second ink includes a water-soluble urethane resin,
wherein the coloring material is a pigment,
wherein an acid value $N_1$ (mg KOH/g) of the water-soluble urethane resin in the second ink is 60 mg KOH/g or more less than an acid value $N_2$ (mg KOH/g) of the water-soluble resin in the first ink, and
wherein, in the second ink, a mass ratio of a content U (% by mass) of the water-soluble urethane resin relative to a content P (% by mass) of the pigment is 0.10 times or more, and
wherein the method comprises a step of applying the first ink onto an image recorded with the second ink.

* * * * *